US009628161B2

(12) United States Patent
Ljung et al.

(10) Patent No.: US 9,628,161 B2
(45) Date of Patent: *Apr. 18, 2017

(54) ANTENNA SWAPPING METHODS INCLUDING COMPARING PERFORMANCE CHARACTERISTICS OF FIRST AND SECOND ANTENNAS, AND RELATED PORTABLE ELECTRONIC DEVICES

(71) Applicant: Sony Corporation, Tokyo (JP)

(72) Inventors: Rickard Ljung, Lund (SE); Thomas Bolin, Lund (SE); Zhinong Ying, Lund (SE); Erik Bengtsson, Lund (SE)

(73) Assignees: Sony Corporation, Tokyo (JP); Sony Mobile Communications Inc., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/997,736

(22) Filed: Jan. 18, 2016

(65) Prior Publication Data
US 2016/0134349 A1 May 12, 2016

Related U.S. Application Data

(63) Continuation of application No. 14/375,583, filed as application No. PCT/IB2012/000604 on Mar. 23, 2012, now Pat. No. 9,240,830.

(51) Int. Cl.
*H04B 7/06* (2006.01)
*H04B 1/3827* (2015.01)
(Continued)

(52) U.S. Cl.
CPC ......... *H04B 7/0608* (2013.01); *H04B 1/3827* (2013.01); *H04B 7/0811* (2013.01); *H04W 72/0406* (2013.01); *H04B 7/0837* (2013.01)

(58) Field of Classification Search
CPC .................................................. H04B 7/0608
See application file for complete search history.

(56) References Cited

U.S. PATENT DOCUMENTS 6,226,508 B1 * 5/2001 Takahashi ............ H04B 7/0608
375/267
7,742,770 B2 6/2010 Campbell et al.
(Continued)

FOREIGN PATENT DOCUMENTS

EP 0364190 A2 4/1990
EP 0889603 A2 1/1999
(Continued)

OTHER PUBLICATIONS

European Office Action Corresponding to European Patent Application No. 12717470.4; Date Mailed: Apr. 6, 2016; 5 Pages.
(Continued)

*Primary Examiner* — Tuan H Nguyen
(74) *Attorney, Agent, or Firm* — Myers Bigel, P.A.

(57) ABSTRACT

An antenna switching method includes tuning respective signals provided to first and second antennas in a portable electronic device to at least one frequency band. The method may also include connecting the first antenna to an uplink signal path that is for transmissions through the first and second antennas, and performing impedance matching for the first antenna. The method may further include comparing a real-time performance characteristic of the first antenna with a real-time performance characteristic of the second antenna. The method may additionally include, responsive to determining that the second antenna has a stronger real-time performance characteristic than the first antenna while the first antenna is connected to the uplink signal path, switching from the first antenna to the second antenna by connecting the second antenna to the uplink signal path and
(Continued)

disconnecting the first antenna from the uplink signal path, and performing impedance matching for the second antenna.

20 Claims, 14 Drawing Sheets

(51) Int. Cl.
  *H04W 72/04* (2009.01)
  *H04B 7/08* (2006.01)

(56) References Cited

U.S. PATENT DOCUMENTS

| 8,514,143 B2* | 8/2013 | Hsu ..................... H01Q 1/2266 343/702 |
|---|---|---|
| 2004/0033787 A1 | 2/2004 | Weber et al. |
| 2009/0046030 A1 | 2/2009 | Song et al. |
| 2010/0022192 A1 | 1/2010 | Knudsen et al. |
| 2011/0136446 A1 | 6/2011 | Komninakis et al. |

FOREIGN PATENT DOCUMENTS

| EP | 1928107 A1 | 6/2008 |
|---|---|---|
| EP | 2180603 A1 | 4/2010 |

OTHER PUBLICATIONS

International Search Report Corresponding to International Application No. PCT/IB2012/000604; Date of Mailing: Oct. 16, 2012; 3 Pages.

Notification Concerning Transmittal of International Preliminary Report on Patentability in corresponding PCT Application No. PCT/IB2012/000604, mailed Oct. 2, 2014 (10 pages).

European Office Action Corresponding to European Patent Application No. 13183927.6; Date Mailed: Mar. 26, 2015; 7 Pages.

European Office Action Corresponding to European Patent Application No. 12717470.4; Date Mailed: Jun. 29, 2015; 6 Pages.

* cited by examiner

ANTENNA SWAPPING METHODS INCLUDING COMPARING PERFORMANCE CHARACTERISTICS OF FIRST AND SECOND ANTENNAS, AND RELATED PORTABLE ELECTRONIC DEVICES

CROSS-REFERENCE TO RELATED APPLICATIONS

This U.S. non-provisional application is a continuation of U.S. patent application Ser. No. 14/375,583, filed on Jul. 30, 2014, which is a 35 U.S.C. §371 national stage application of PCT International Application No. PCT/IB2012/000604, filed on 23 Mar. 2012, the disclosure and content of each of which are hereby incorporated by reference herein as if set forth in their entireties.

FIELD

The present inventive concept generally relates to the field of communications and, more particularly, to antennas and portable electronic devices incorporating the same.

BACKGROUND

Portable electronic devices may include impedance-matching circuitry. Moreover, antenna/radio performance may be monitored and used to adaptively control a tunable matching circuit or to affect a tunable antenna, in an effort to improve output power under loaded conditions. An example of adaptive matching is using a coupler to sense S-parameters for reflected output power signals for an antenna of a portable electronic device, as well as phase angles between reflected and forward waves, and then using an algorithm to calculate a setting to reduce the reflected power.

Additionally, the use of diversity antennas in portable electronic devices has become common for use in diversity and/or Multiple Input Multiple Output (MIMO) operations in a downlink. Because the diversity antennas may be used exclusively in the downlink, however, they may operate at relatively low power levels, which can increase the difficulty of monitoring diversity antenna performance.

SUMMARY

Various embodiments of the present inventive concept include an antenna swapping method. The antenna swapping method may include using control circuitry and tuning circuitry to perform tuning of respective signals provided to first and second antennas in a portable electronic device to at least one frequency band. The method may also include connecting the first antenna to an uplink signal path that is for transmissions through the first and second antennas, and performing impedance matching for the first antenna. The method may further include comparing a real-time performance characteristic of the first antenna with a real-time performance characteristic of the second antenna. The method may additionally include determining that the second antenna has a stronger real-time performance characteristic than the first antenna while the first antenna is connected to the uplink signal path. The method may also include, responsive to the determining that the second antenna has the stronger real-time performance characteristic, swapping from the first antenna to the second antenna by connecting the second antenna to the uplink signal path and disconnecting the first antenna from the uplink signal path, and performing impedance matching for the second antenna.

In various embodiments, the method may further include, after determining that the second antenna has a stronger real-time performance characteristic than the first antenna, tuning the second antenna to a frequency band to which the first antenna had been tuned.

According to various embodiments, tuning the respective signals provided to the first and second antennas to at least one frequency band may include tuning the respective signals before swapping from the first antenna to the second antenna.

In various embodiments, the method may further include: after tuning the second antenna to a frequency band to which the first antenna had been tuned, comparing the real-time performance characteristic of the first antenna with the real-time performance characteristic of the second antenna; upon determining that the real-time performance characteristic of the first antenna exceeds the real-time performance characteristic of the second antenna, swapping from the second antenna to the first antenna; and in response to swapping from the second antenna to the first antenna, re-tuning the first antenna to the frequency band to which the first antenna had been tuned.

According to various embodiments, comparing the real-time performance characteristics of the first and second antennas, respectively, may include comparing a received signal strength indication of the first antenna with a received signal strength indication of the second antenna.

In various embodiments, performing impedance matching for the second antenna may include performing impedance matching only with respect to an uplink of the portable electronic device, by using an uplink signal of the second antenna via the uplink signal path.

According to various embodiments, a main signal path in the portable electronic device may include the uplink signal path for uplink signals and may further provide a path for downlink signals. Moreover, the portable electronic device may further include a diversity signal path that is for downlink signals only.

In various embodiments, the method may further include connecting the second antenna to the main signal path in response to comparing the received signal strength indication of the first antenna with the received signal strength indication of the second antenna and determining that the second antenna has a stronger signal strength.

According to various embodiments, swapping from the first antenna to the second antenna may include commanding a multiplexer connected between the main and diversity signal paths and the first and second antennas to connect the second antenna to the main signal path.

In various embodiments, third and fourth antennas may also be connected to the multiplexer. Moreover, commanding the multiplexer to connect the second antenna to the main signal path may include commanding the multiplexer to disconnect at least one of the first, third, and fourth antennas from the main signal path.

A portable electronic device according to various embodiments may include first and second antennas connected to a multi-band transceiver circuit configured to provide communications for the portable electronic device via a plurality of frequency bands, the first and second antennas being connected to the multi-band transceiver circuit via main and diversity signal paths, respectively, the main signal path including an uplink signal path that is configured for transmissions through the first and second antennas. The portable electronic device may also include antenna tuning circuitry configured to tune respective signals provided to the first and second antennas to at least one of the plurality of frequency bands. Additionally, the portable electronic device may include a controller configured to: compare a real-time performance characteristic of the first antenna with a real-time performance characteristic of the second antenna; determine that the second antenna has a stronger real-time performance characteristic than the first antenna while the first antenna is connected to the uplink signal path; and swap from performing impedance matching for the first antenna to performing impedance matching for the second antenna by connecting the second antenna to the uplink signal path and disconnecting the first antenna from the uplink signal path, responsive to the determination.

In various embodiments, the main signal path may provide a path for both uplink and downlink signals, whereas the diversity signal path provides a path for downlink signals only.

According to various embodiments, the antenna tuning circuitry may be configured to tune the second antenna to a frequency band to which the first antenna had been tuned, after determining that the second antenna has a stronger real-time performance characteristic than the first antenna.

In various embodiments, the antenna tuning circuitry may be configured to tune the first and second antennas to at least one of the plurality of frequency bands before the controller swaps from performing impedance matching for the first antenna to performing impedance matching for the second antenna.

According to various embodiments, the controller may be configured to command a multiplexer connected between the main and diversity signal paths and the first and second antennas to switch which of the first and second antennas is connected to the main signal path.

In various embodiments, the portable electronic device may include a non-transitory storage medium that stores at least one of an antenna tuning algorithm and an antenna swapping algorithm. Additionally, the controller may be configured to control input of the real-time performance characteristics of the first and second antennas, respectively, into the at least one of the antenna tuning algorithm and the antenna swapping algorithm. Moreover, the controller may be further configured to control input of an output of the at least one of the antenna tuning algorithm and the antenna swapping algorithm into the multiplexer to switch which of the first and second antennas is connected to the main signal path.

According to various embodiments, the portable electronic device may further include first and second couplers configured to sense uplink signal power, the first and second couplers being connected between the first and second antennas, respectively, and the multiplexer.

In various embodiments, the portable electronic device may further include a coupler configured to sense uplink signal power, the coupler being connected between the multiplexer and the multi-band transceiver circuit.

According to various embodiments, the portable electronic device may further include third and fourth antennas connected to the multiplexer. Also, the controller may be configured to command the multiplexer to connect at least one of the first, second, third, and fourth antennas to the main signal path.

In various embodiments, the controller may be configured to command the multiplexer to connect the second and third antennas to the main signal path, and to disconnect the first and fourth antennas from the main signal path.

Other devices and/or operations according to embodiments of the inventive concept will be or become apparent to one with skill in the art upon review of the following drawings and detailed description. It is intended that all such additional devices and/or operations be included within this description, be within the scope of the present inventive concept, and be protected by the accompanying claims. Moreover, it is intended that all embodiments disclosed herein can be implemented separately or combined in any way and/or combination.

DETAILED DESCRIPTION OF EMBODIMENTS

Figure 1:
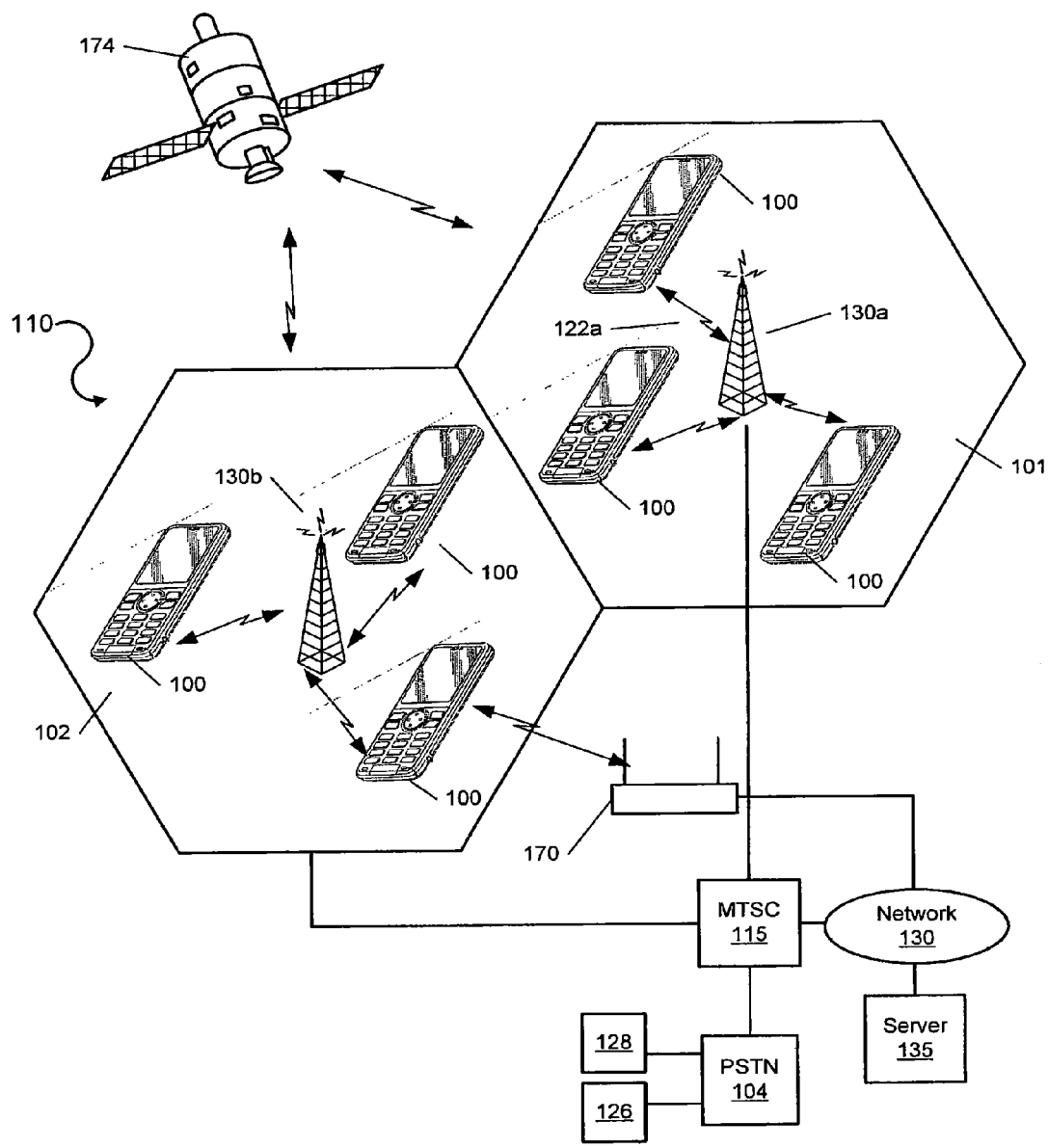
FIG. 1 is a schematic illustration of a wireless communications network that provides service to portable electronic devices, according to various embodiments of the present inventive concept.

The present inventive concept now will be described more fully with reference to the accompanying drawings, in which embodiments of the inventive concept are shown. However, the present application should not be construed as limited to the embodiments set forth herein. Rather, these embodiments are provided so that this disclosure will be thorough and complete, and to fully convey the scope of the embodiments to those skilled in the art. Like reference numbers refer to like elements throughout.

The terminology used herein is for the purpose of describing particular embodiments only and is not intended to be limiting of the embodiments. As used herein, the singular forms "a," "an," and "the" are intended to include the plural forms as well, unless the context clearly indicates otherwise. It will be further understood that the terms "comprises," "comprising," "includes," and/or "including," when used herein, specify the presence of stated features, steps, operations, elements, and/or components, but do not preclude the presence or addition of one or more other features, steps, operations, elements, components, and/or groups thereof.

It will be understood that when an element is referred to as being "coupled," "connected," or "responsive" to another element, it can be directly coupled, connected, or responsive to the other element, or intervening elements may also be present. In contrast, when an element is referred to as being "directly coupled," "directly connected," or "directly responsive" to another element, there are no intervening elements present. As used herein the term "and/or" includes any and all combinations of one or more of the associated listed items.

Spatially relative terms, such as "above", "below", "upper", "lower" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly. Well-known functions or constructions may not be described in detail for brevity and/or clarity.

It will be understood that, although the terms first, second, etc. may be used herein to describe various elements, these elements should not be limited by these terms. These terms are only used to distinguish one element from another. Thus, a first element could be termed a second element without departing from the teachings of the present embodiments.

Unless otherwise defined, all terms (including technical and scientific terms) used herein have the same meaning as commonly understood by one of ordinary skill in the art to which these embodiments belong. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

It is to be understood that the functions/acts indicated in the illustrated blocks may occur out of the order noted in the operational illustrations. For example, two blocks shown in succession may in fact be executed substantially concurrently or the blocks may sometimes be executed in the reverse order, depending upon the functionality/acts involved.

For purposes of illustration and explanation only, various embodiments of the present inventive concept are described herein in the context of "portable electronic devices." Among other devices/systems, portable electronic devices may include multi-band wireless communication terminals (e.g., wireless terminals/mobile terminals/terminals) that are configured to carry out cellular communications (e.g., cellular voice and/or data communications) in more than one frequency band. It will be understood, however, that the present inventive concept is not limited to such embodiments and may be embodied generally in any device and/or system that includes multi-band Radio Frequency (RF) antennas that are configured to transmit and receive in two or more frequency bands.

Although some portable electronic devices have included adaptive matching capabilities, monitoring antenna/radio performance can be difficult. In particular, monitoring performance conditions for diversity antennas can be difficult if the diversity antennas are used for downlink operations only. Various embodiments of the operations and related portable electronic devices described herein, however, may use antenna swapping to adaptively match multiple antennas (e.g., to adaptively match both main and diversity antennas).

Moreover, swapping from one antenna (or group of antennas) to another may be triggered in response to a comparison of real-time performance characteristics of the antennas. For example, a hand of a user of a portable electronic device may touch a first antenna (or the first antenna may otherwise be loaded), and may cause a performance decrease (e.g., as measured by received signal strength) that is significant enough to warrant switching from the first antenna to a second antenna. Accordingly, after first tuning and/or impedance-matching the first antenna, various embodiments of the operations and related portable electronic devices described herein may swap to the second antenna and tune/match the second antenna (e.g., using default register settings for the second antenna or using settings that were saved when using the first antenna), in response to determining that the first antenna is loaded (and/or determining that performance of the second antenna would be better than the current performance of the first antenna).

Referring to FIG. 1, a diagram is provided of a wireless communications network 110 that supports communications in which portable electronic devices 100 can be used according to various embodiments of the present inventive concept. The network 110 includes cells 101, 102 and base stations 130a, 130b in the respective cells 101, 102. Networks 110 are commonly employed to provide voice and data communications to subscribers using various radio access standards/technologies. The network 110 may include portable electronic devices 100 that may communicate with the base stations 130a, 130b. The portable electronic devices 100 in the network 110 may also communicate with a Global Positioning System (GPS) 174, a local wireless network 170, a Mobile Telephone Switching Center (MTSC) 115, and/or a Public Service Telephone Network (PSTN) 104 (i.e., a "landline" network).

The portable electronic devices 100 can communicate with each other via the Mobile Telephone Switching Center (MTSC) 115. The portable electronic devices 100 can also communicate with other devices/terminals, such as terminals 126, 128, via the PSTN 104 that is coupled to the network 110. As also shown in FIG. 1, the MTSC 115 is coupled to a computer server 135 via a network 130, such as the Internet.

The network 110 is organized as cells 101, 102 that collectively can provide service to a broader geographic region. In particular, each of the cells 101, 102 can provide service to associated sub-regions (e.g., the hexagonal areas illustrated by the cells 101, 102 in FIG. 1) included in the broader geographic region covered by the network 110. More or fewer cells can be included in the network 110, and the coverage area for the cells 101, 102 may overlap. The shape of the coverage area for each of the cells 101, 102 may be different from one cell to another and is not limited to the hexagonal shapes illustrated in FIG. 1. Each of the cells 101, 102 may include an associated base station 130a, 130b. The base stations 130a, 130b can provide wireless communications between each other and the portable electronic devices 100 in the associated geographic region covered by the network 110.

Each of the base stations 130a, 130b can transmit/receive data to/from the portable electronic devices 100 over an associated control channel. For example, the base station 130a in cell 101 can communicate with one of the portable electronic devices 100 in cell 101 over the control channel 122a. The control channel 122a can be used, for example, to page the portable electronic device 100 in response to calls directed thereto or to transmit traffic channel assignments to the portable electronic device 100 over which a call associated therewith is to be conducted.

The portable electronic devices 100 may also be capable of receiving messages from the network 110 over the respective control channel 122a. In various embodiments according to the inventive concept, the portable electronic devices 100 receive Short Message Service (SMS), Enhanced Message Service (EMS), Multimedia Message Service (MMS), and/or Smartmessaging™ formatted messages.

The GPS 174 can provide GPS information to the geographic region including cells 101, 102 so that the portable electronic devices 100 may determine location information. The network 110 may also provide network location information as the basis for the location information applied by the portable electronic devices 100. In addition, the location information may be provided directly to the server 135 rather than to the portable electronic devices 100 and then to the server 135. Additionally or alternatively, the portable electronic devices 100 may communicate with the local wireless network 170.

Figure 2A:
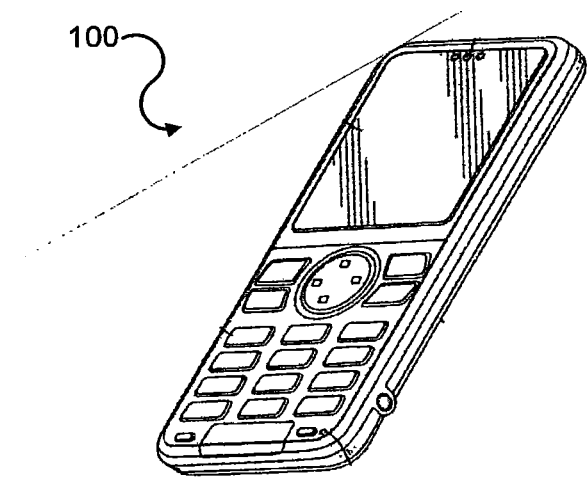
FIGS. 2A and 2B illustrate front and rear views, respectively, of a portable electronic device, according to various embodiments of the present inventive concept.
Figure 2B:
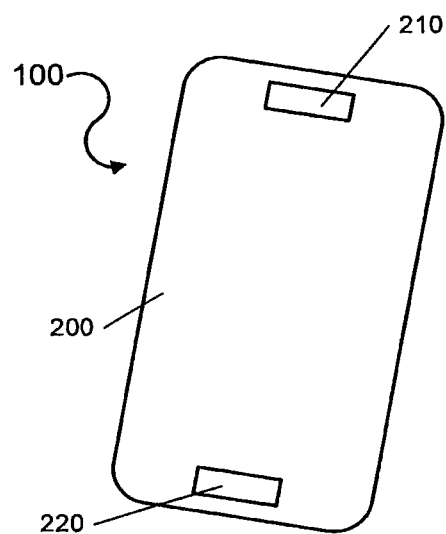

FIGS. 2A and 2B illustrate front and rear views, respectively, of a portable electronic device 100, according to various embodiments of the present inventive concept. Accordingly, FIGS. 2A and 2B illustrate opposite sides of the portable electronic device 100. In particular, FIG. 2B illustrates an external face 200 of a backplate of the portable electronic device 100. Accordingly, the external face 200 of the backplate may be visible to, and/or in contact with, the user of the portable electronic device 100. In contrast, an internal face of the backplate may face internal portions of the portable electronic device 100, such as a transceiver circuit.

FIG. 2B further illustrates a first antenna 210 on one end of the portable electronic device 100, and a second antenna 220 on another end of the portable electronic device 100. It will be understood, however, that the portable electronic device 100 may include more than two antennas, and/or that the antennas 210, 220 may be arranged at various locations of the portable electronic device 100. The antennas 210, 220 may be antennas configured for wireless communications. For example, at least one of the antennas 210, 220 may be a monopole antenna or a planar inverted-F antenna (PIFA), among others. Additionally, at least one of the antennas 210, 220 may be a multi-band antenna and/or may be configured to communicate cellular and/or non-cellular frequencies. Moreover, according to various embodiments, both of the antennas 210, 220 may be designed to cover all frequency bands of interest to the portable electronic device 100, and both may be configured to transmit at full power.

Figure 3A:
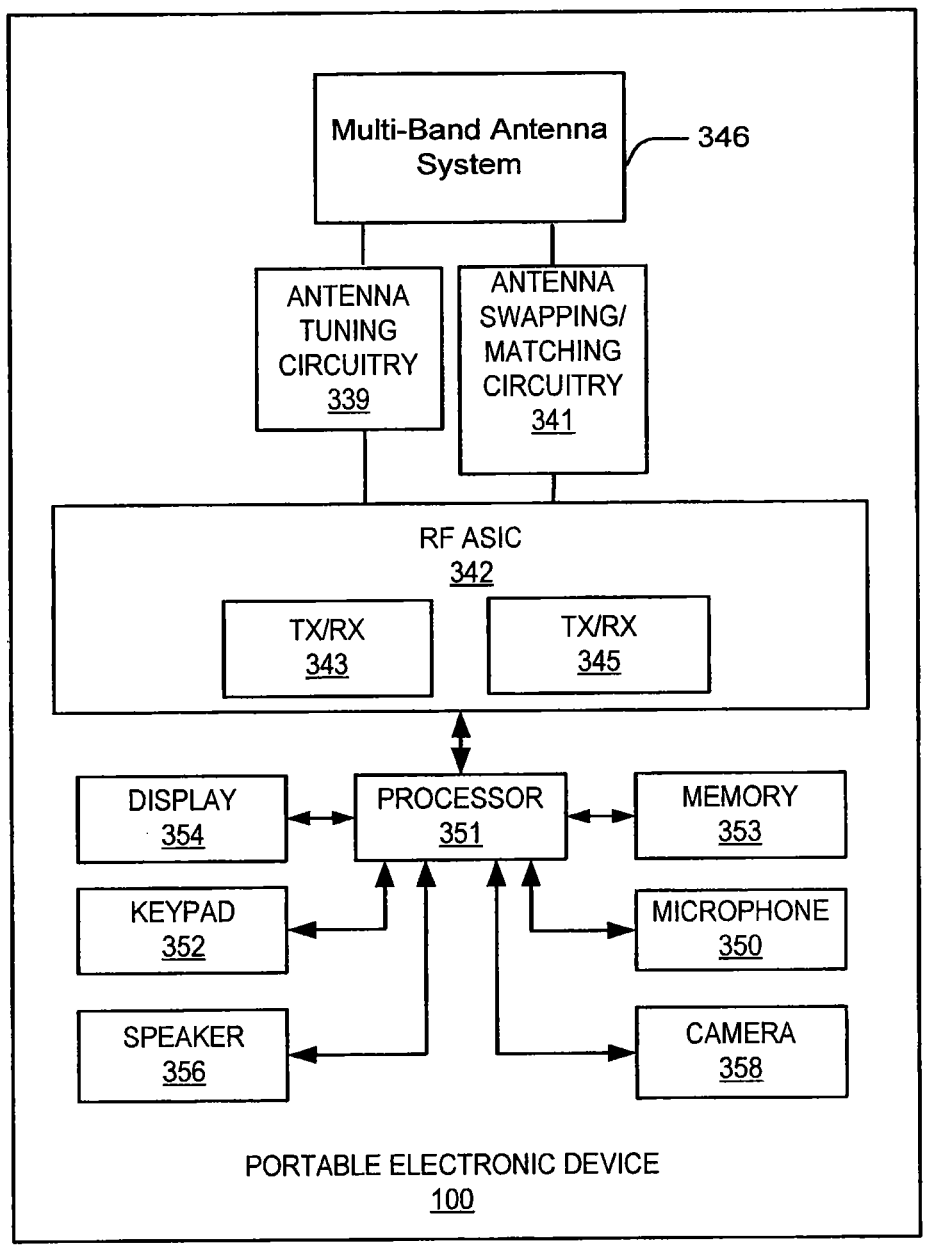
FIGS. 3A-3C are block diagrams illustrating portable electronic devices, according to various embodiments of the present inventive concept.
Figure 3B:
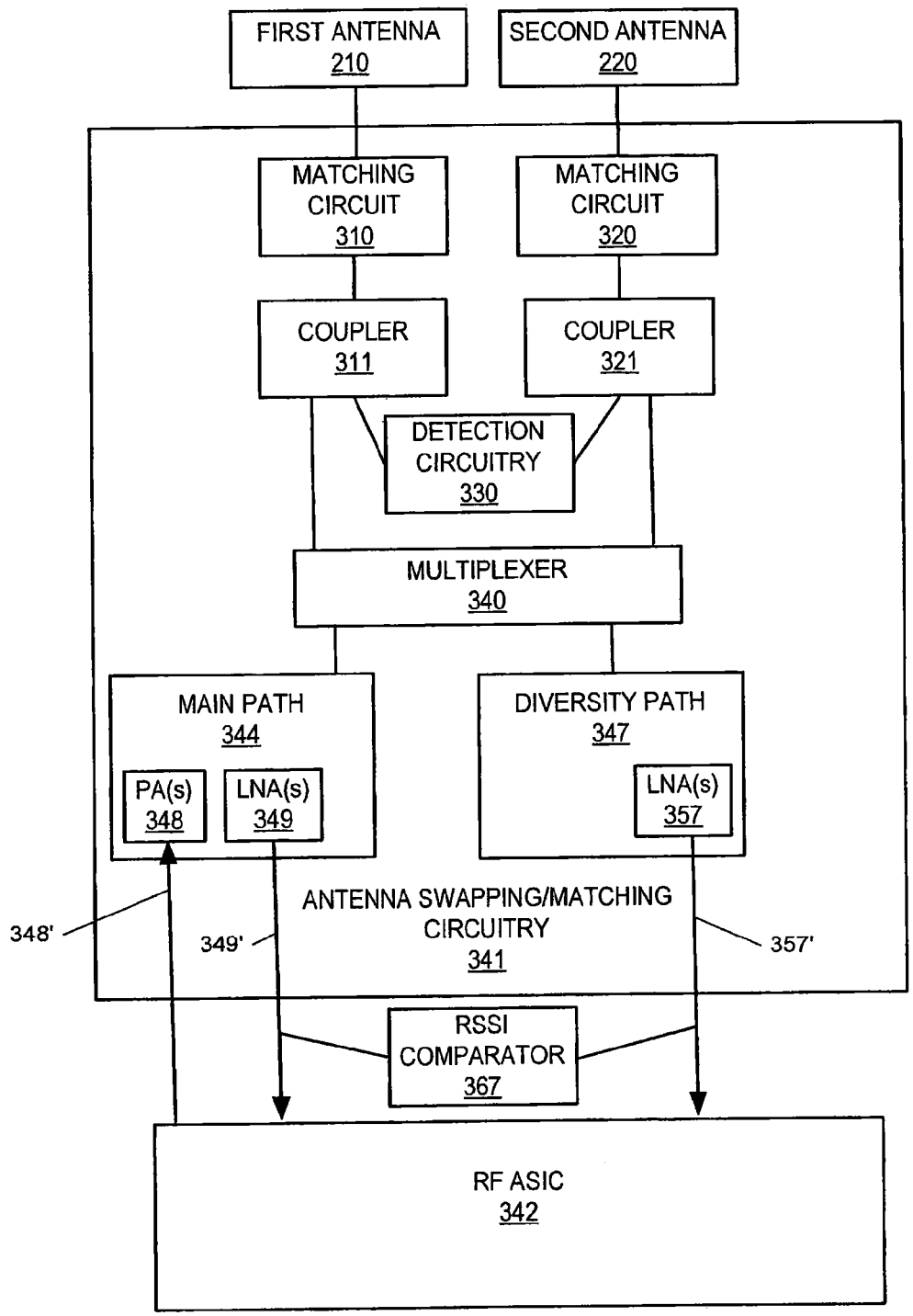
Figure 3C:
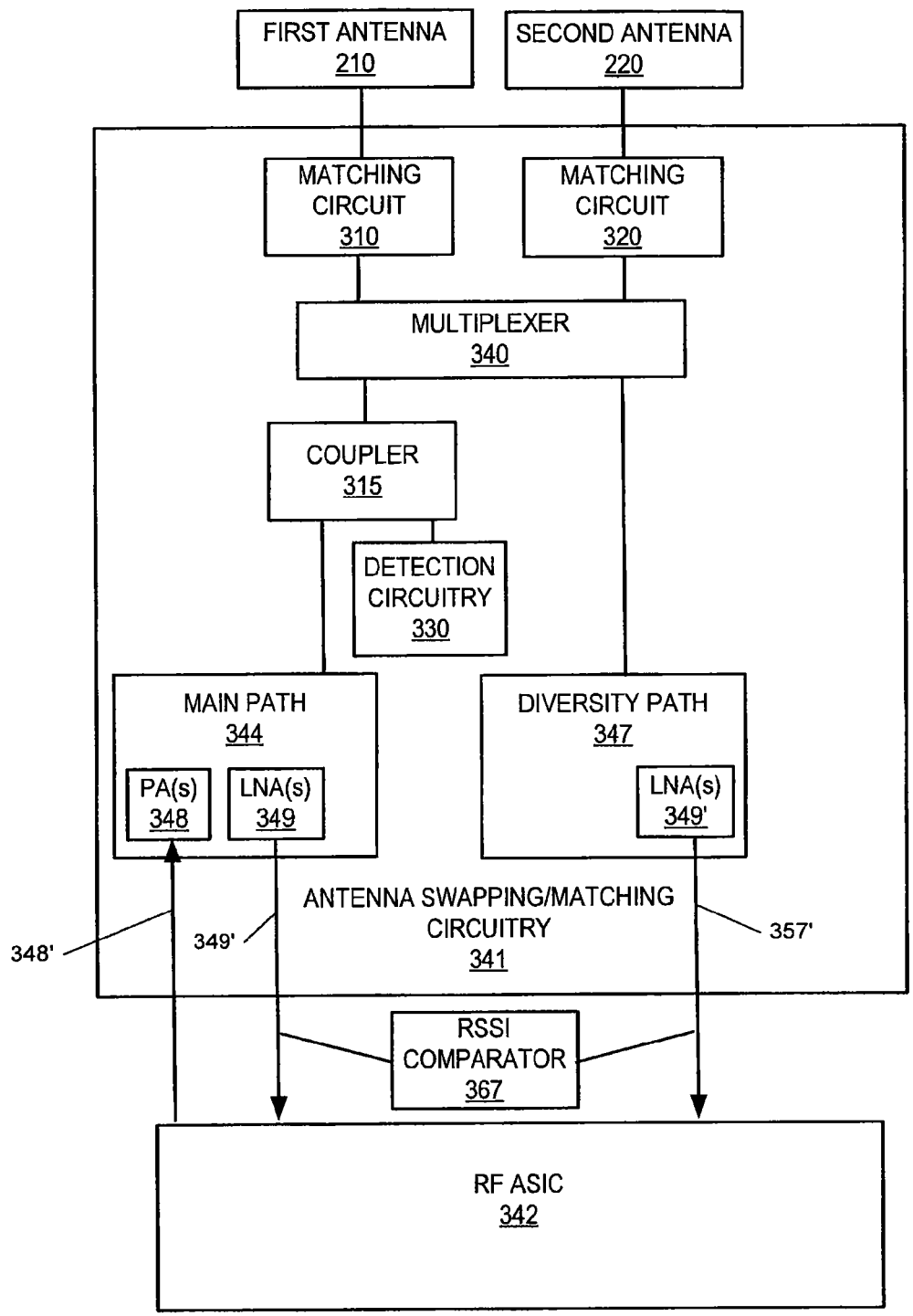

Referring now to FIGS. 3A-3C, block diagrams are provided illustrating portable electronic devices 100, according to various embodiments of the present inventive concept. As illustrated in FIG. 3A, a portable electronic device 100 may include a multi-band antenna system 346, antenna tuning circuitry 339, antenna swapping/matching circuitry 341, a Radio Frequency (RF) Application Specific Integrated Circuit (ASIC) (including, e.g., a transceiver) 342, and a processor 351. The portable electronic device 100 may further include a display 354, keypad 352, speaker 356, memory 353, microphone 350, and/or camera 358. The antenna swapping/matching circuitry 341 is connected to both main and diversity signal paths of the portable electronic device 100 such that it can provide swapping of connections of different antennas in the multi-band antenna system 346 between the main and diversity signal paths.

The RF ASIC 342 may include transmit/receive circuitry (TX/RX) that provides separate communication paths for supplying/receiving RF signals to different radiating elements of the multi-band antenna system 346 via their respective RF feeds. Accordingly, when the multi-band antenna system 346 includes two antenna elements (e.g., the antennas 210, 220), the RF ASIC 342 may include two transmit/receive circuits 343, 345 connected to different ones of the antenna elements via the respective RF feeds.

The RF ASIC 342, in operational cooperation with the processor 351, may be configured to communicate according to at least one radio access technology in two or more frequency ranges. The at least one radio access technology may include, but is not limited to, WLAN (e.g., 802.11), WiMAX (Worldwide Interoperability for Microwave Access), TransferJet, 3GPP LTE (3rd Generation Partnership Project Long Term Evolution), 4G, Time Division LTE (TD LTE), Universal Mobile Telecommunications System (UMTS), Global Standard for Mobile (GSM) communication, General Packet Radio Service (GPRS), enhanced data rates for GSM evolution (EDGE), DCS, PDC, PCS, code division multiple access (CDMA), wideband-CDMA, and/or CDMA2000. The radio access technology may operate using such frequency bands as 700-800 Megahertz (MHz), 824-894 MHz, 880-960 MHz, 1710-1880 MHz, 1820-1990 MHz, 1920-2170 MHz, 2300-2400 MHz, and 2500-2700 MHz. Other radio access technologies and/or frequency bands can also be used in embodiments according to the inventive concept. Various embodiments may provide coverage for non-cellular frequency bands such as Global Positioning System (GPS), Wireless Local Area Network (WLAN), and/or Bluetooth frequency bands. As an example, in various embodiments according to the inventive concept, the local wireless network 170 (illustrated in FIG. 1) is a WLAN compliant network. In various other embodiments according to the inventive concept, the local wireless network 170 is a Bluetooth compliant interface.

A transmitter portion of a transceiver of the RF ASIC 342 converts information, which is to be transmitted by the portable electronic device 100, into electromagnetic signals suitable for radio communications. A receiver portion of the transceiver of the RF ASIC 342 demodulates electromagnetic signals, which are received by the portable electronic device 100 from the network 110 (illustrated in FIG. 1) to provide the information contained in the signals in a format understandable to a user of the portable electronic device 100.

The portable electronic device 100 is not limited to any particular combination/arrangement of the keypad 352 and the display 354. As an example, it will be understood that the functions of the keypad 352 and the display 354 can be provided by a touch screen through which the user can view information, such as computer displayable documents, provide input thereto, and otherwise control the portable electronic device 100. Additionally or alternatively, the portable electronic device 100 may include a separate keypad 352 and display 354.

Referring still to FIG. 3A, the memory 353 can store computer program instructions that, when executed by the processor circuit 351, carry out the operations described herein and shown in the figures. As an example, the memory 353 can be non-volatile memory, such as EEPROM (flash memory), that retains the stored data while power is removed from the memory 353.

Referring now to FIG. 3B, a block diagram is provided for the antenna swapping/matching circuitry 341 of the portable electronic device 100. According to various embodiments, the antenna swapping/matching circuitry 341 of the portable electronic device 100 may include matching circuits 310, 320 that are connected to the first and second antennas 210, 220, respectively, of the multi-band antenna system 346 of the portable electronic device 100. Moreover, it will be understood by those skilled in the art that the matching circuits 310, 320 may be combined with the antenna tuning circuitry 339 or may be separate from the antenna tuning circuitry 339. Each of the matching circuits 310, 320 may include, for example, one or more tunable capacitors and/or other matching circuitry. According to various embodiments, the selection of electronic components of the matching circuits 310, 320 may depend upon the impedance of the first and second antennas 210, 220, respectively.

The matching circuits 310, 320 may be further connected to one or more couplers 311, 321 (which may be combined with and/or connected to detection circuitry 330). If the antenna swapping/matching circuitry 341 includes multiple couplers (e.g., both the coupler 311 and the coupler 321), then the couplers 311, 321 may be connected between respective ones of the matching circuits 310, 320 and a multiplexer 340. The multiplexer 340 may be further connected to both a main signal path 344 and a diversity signal path 347, such that the multiplexer 340 connects one of first and second antennas 210, 220 to the main signal path 344, and the other one of the first and second antennas 210, 220 to the diversity signal path 347.

The main signal path 344 may provide paths for both uplink and downlink signals, whereas the diversity signal path 347 may provide only a downlink path. For example, FIG. 3B illustrates uplink and downlink paths 348', 349', respectively, along the main signal path 344 between the RF ASIC 342 and one of the first and second antennas 210, 220. In contrast, only the downlink path 357' is along the diversity signal path 347 between the RF ASIC 342 and one of the first and second antennas 210, 220. Accordingly, although each of the main signal path 344 and the diversity signal path 347 may include one or more Low Noise Amplifiers (LNAs) 349, 357, respectively, the main signal path 344 may additionally include one or more Power Amplifiers (PAs) 348, whereas PAs may be absent from the diversity signal path 347. Moreover, a Received Signal Strength Indication (RSSI) comparator circuit 367 may be configured to compare the strength of a downlink signal along the downlink path 349' with the strength of a downlink signal along the downlink path 357'.

Referring now to FIG. 3C, a block diagram is provided for the antenna swapping/matching circuitry 341 of the portable electronic device 100. In contrast with the dual couplers 311, 321 illustrated in FIG. 3B, FIG. 3C illustrates that a single coupler 315 (which may be combined with and/or connected to detection circuitry 330) is connected between the multiplexer 340 and the main signal path 344. In other words, the multiplexer 340 is between the matching circuits 310, 320 and the single coupler 315. A possible advantage of using the single coupler 315 exclusively (rather than using both of the couplers 311, 321 that are illustrated in FIG. 3B) may be simpler/smaller antenna swapping/matching circuitry 341. On the other hand, because the single coupler 315 is on the other side of the multiplexer 340 such that the multiplexer 340 selects which of the first and second antennas 210, 220 connects to the single coupler 315, the single coupler 315 is farther from the matching circuits 310, 320. As a result, a possible disadvantage of using the single coupler 315 may be reduced performance in comparison with FIG. 3B's arrangement that positions the couplers 311, 321 closer to the matching circuits 310, 320.

Regardless of whether the antenna swapping/matching circuitry 341 includes the dual couplers 311, 321 (FIG. 3B) or the single coupler 315 (FIG. 3C), the coupler(s) and/or the detection circuitry 330 may be used to sense uplink/transmit signal power along the uplink path 348' of the main signal path 344. In other words, the coupler(s) and/or the detection circuitry 330 may sense the power of signals transmitted from the RF ASIC 342 to the first antenna 210 or the second antenna 220. Accordingly, even if the antenna swapping/matching circuitry 341 includes the dual couplers 311, 321 (FIG. 3B), only the particular one of the couplers 311, 321 that is connected to the main signal path 344 may be used to sense the uplink/transmit signal power.

Moreover, it will be understood that the uplink/transmit signal may be used for adaptive matching because uplink power levels may be sufficiently high (e.g., may range from about 0.0 decibels (dB) to about 10.0 dB), for adaptive matching, even if downlink power levels are too low for adaptive matching. Accordingly, if the multiplexer 340 were absent from the antenna swapping/matching circuitry 341, then the portable electronic device 100 might not be able to match/tune a diversity antenna that is only connected to the diversity path 347. The multiplexer 340 therefore provides antenna swapping for the first and second antennas 210, 220, and this antenna swapping may be used to swap between adaptively matching the first antenna 210 and adaptively matching the second antenna 220.

Figure 4:
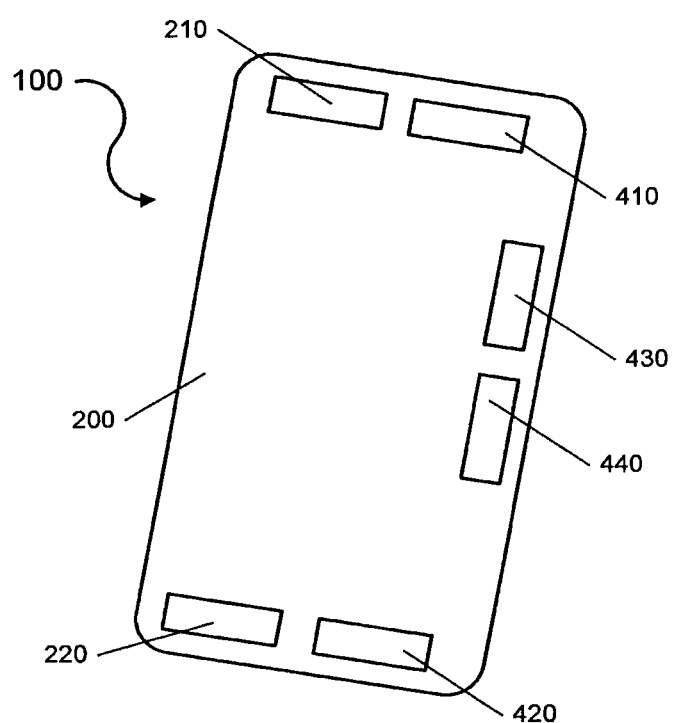
FIG. 4 illustrates a portable electronic device including several possible antenna combinations, according to various embodiments of the present inventive concept.

Referring now to FIG. 4, a portable electronic device 100 including several possible antenna combinations is illustrated, according to various embodiments of the present inventive concept. In particular, FIG. 4 illustrates third and fourth antennas 410, 420, in addition to the first and second antennas 210, 220. Moreover, FIG. 4 illustrates that one or more antennas (e.g., side antennas 430, 440, which may be notch/slot antennas, among other configurations) may be located at a side portion (as opposed to a top or bottom portion) of the portable electronic device 100. Furthermore, although six (6) antennas are illustrated in FIG. 4, it will be understood that the third and/or fourth antennas 410, 420 may be located at a side portion of the portable electronic device 100 rather than the side antennas 430, 440. In other words, the portable electronic device 100 may include three (3) or four (4) antennas, each of which may be located anywhere along the periphery of the portable electronic device 100.

Each of the antennas 210, 220, 410, 420, 430, and 440 may be multi-band antennas. Additionally, the antennas 210, 220, 410, 420, 430, and 440 may be ones of various antennas configured for wireless communications. For example, each of the antennas 210, 220, 410, 420, 430, and 440 may be a monopole antenna or a planar inverted-F antenna (PIFA), among others. Additionally, each of the antennas 210, 220, 410, 420, 430, and 440 may be a multi-band antenna and/or may be configured to communicate cellular and/or non-cellular frequencies. Moreover, each of the antennas 210, 220, 410, 420, 430, and 440 may be a multi-band antenna included within the multi-band antenna system 346 illustrated in FIG. 3A. Furthermore, according to various embodiments, each of the antennas 210, 220, 410, 420, 430, and 440 may be designed to cover all frequency bands of interest to the portable electronic device 100, and each may be configured to transmit at full power.

Referring now to FIGS. 5A-5H, flowcharts are provided illustrating antenna swapping operations that include comparing real-time performance characteristics, according to various embodiments of the present inventive concept.

Figure 5A:
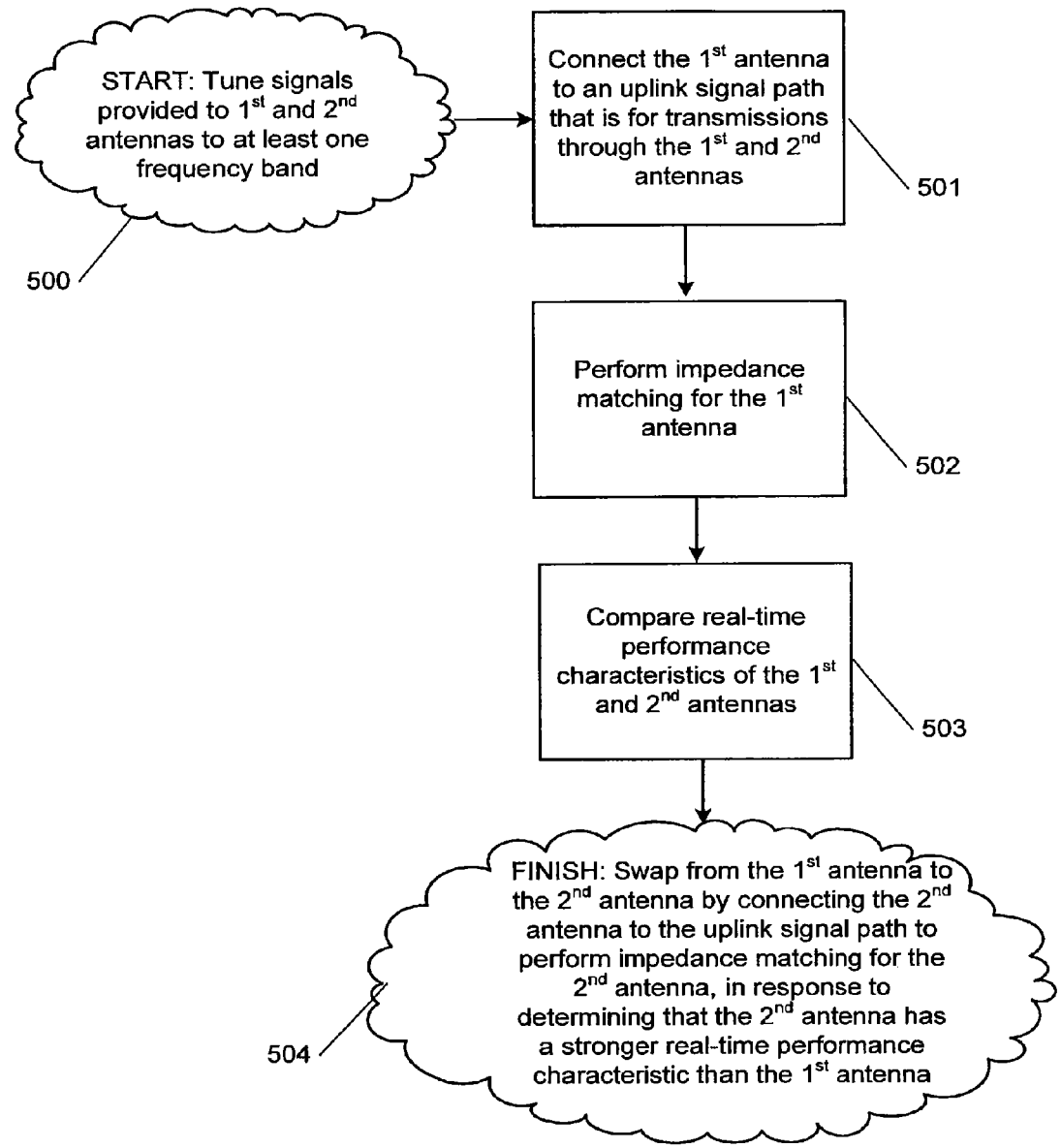
FIGS. 5A-5H are flowcharts illustrating antenna swapping operations that include comparing real-time performance characteristics, according to various embodiments of the present inventive concept.

Referring to FIG. 5A, the operations include using control circuitry (e.g., the processor 351 and/or other control circuitry in the portable electronic device 100) and the antenna tuning circuitry 339 to perform tuning of respective signals provided to the first and second antennas 210, 220 to at least one frequency band (Block 500). For example, various operations (e.g., operations using LTE) may include tuning signals for the first and second antennas 210, 220 to the same frequency band. Alternatively, various other operations (e.g., Simultaneous Voice and LTE (SVLTE)) may include tuning a signal for the first antenna 210 to one frequency band, and tuning a signal for the second antenna 220 to a different frequency band. The operations further include connecting the first antenna 210 to the uplink signal path 348', which provides for transmissions through the first and second antennas 210, 220 (Block 501). The operations additionally include performing impedance matching for the first antenna 210 after connecting the first antenna 210 to the uplink signal path 348' (Block 502).

Referring still to FIG. 5A, the operations also include comparing a real-time performance characteristic of the first antenna 210 with a real-time performance characteristic of the second antenna 220 while the first antenna 210 is connected to the uplink signal path 348' (Block 503). Real-time performance characteristics may include such parameters as PA drain current, PA output impedance, LNA input impedance, received signal strength, and/or antenna input impedance. As will be understood by those skilled in the art, these parameters may be sensed by various sensors in the portable electronic device 100.

Moreover, in response to performing Block 503's comparison and determining that the second antenna 220 has a stronger real-time performance characteristic than that of the first antenna 210, the operations further include swapping from the first antenna 210 to the second antenna 220 (Block 504). Swapping from the first antenna 210 to the second antenna 220 may include connecting the second antenna 220 to the uplink signal path 348' (and disconnecting the first antenna 210 from the uplink signal path 348'), as well as performing impedance matching for the second antenna 220 while the second antenna 220 is connected to the uplink signal path 348'. Furthermore, the portable electronic device 100 may save (e.g., in the memory 353 or the RF ASIC 342) the matching/frequency tuning settings of the first antenna 210 before connecting the second antenna 220 to the uplink signal path 348', and may perform tuning/impedance-matching of the second antenna 220 using the saved settings.

Additionally or alternatively, Block 504's antenna swapping may be triggered based on a predetermined time constant, or other predetermined factors (e.g., based on the first antenna 210 having a real-time performance characteristic fall below a threshold level). Moreover, if the portable electronic device 100 determines based on Block 503 that the second antenna 220 does not have a stronger real-time performance characteristic than that of the first antenna 210, then the portable electronic device 100 may continue operating with the first antenna 210 connected to the uplink signal path 348' until the second antenna 220 does have a stronger real-time performance characteristic than that of the first antenna 210.

Figure 5B:
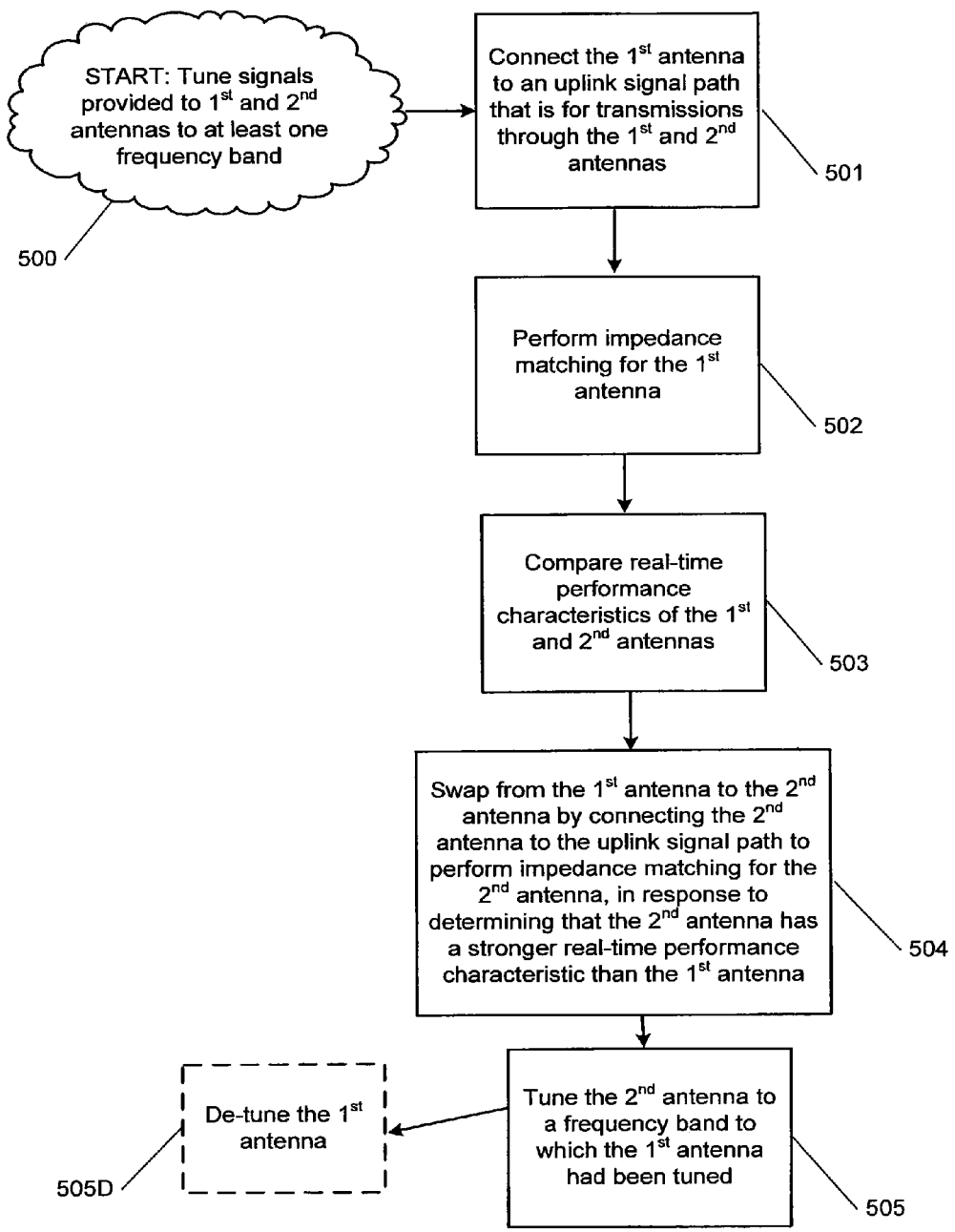

Referring to FIG. 5B, the operations include Blocks 500-504 of FIG. 5A and further include Block 505. In particular, Block 505 illustrates tuning the second antenna 220 to a frequency band to which the first antenna 210 had been tuned, in response to (or as a part of) Block 504's swapping from the first antenna 210 to the second antenna 220. Optionally (e.g., for SVLTE or Single Input Single Output (SISO) operations), the operations may further include de-tuning the first antenna 210 (Block 505D). De-tuning the first antenna 210 may include tuning the first antenna 210 to a frequency different from that to which the second antenna 220 is tuned, to improve isolation with respect to the second antenna 220 (i.e., the active antenna that is connected to the uplink signal path 348'). Additionally or alternatively, it will be understood that tuning the respective signals provided to the first and second antennas 210, 220 may include tuning the respective signals before (or as a part of) Block 504's swapping from the first antenna 210 to the second antenna 220, and/or before (or as a part of) Block 501's connecting the first antenna 210 to the uplink signal path 348'.

Figure 5C:
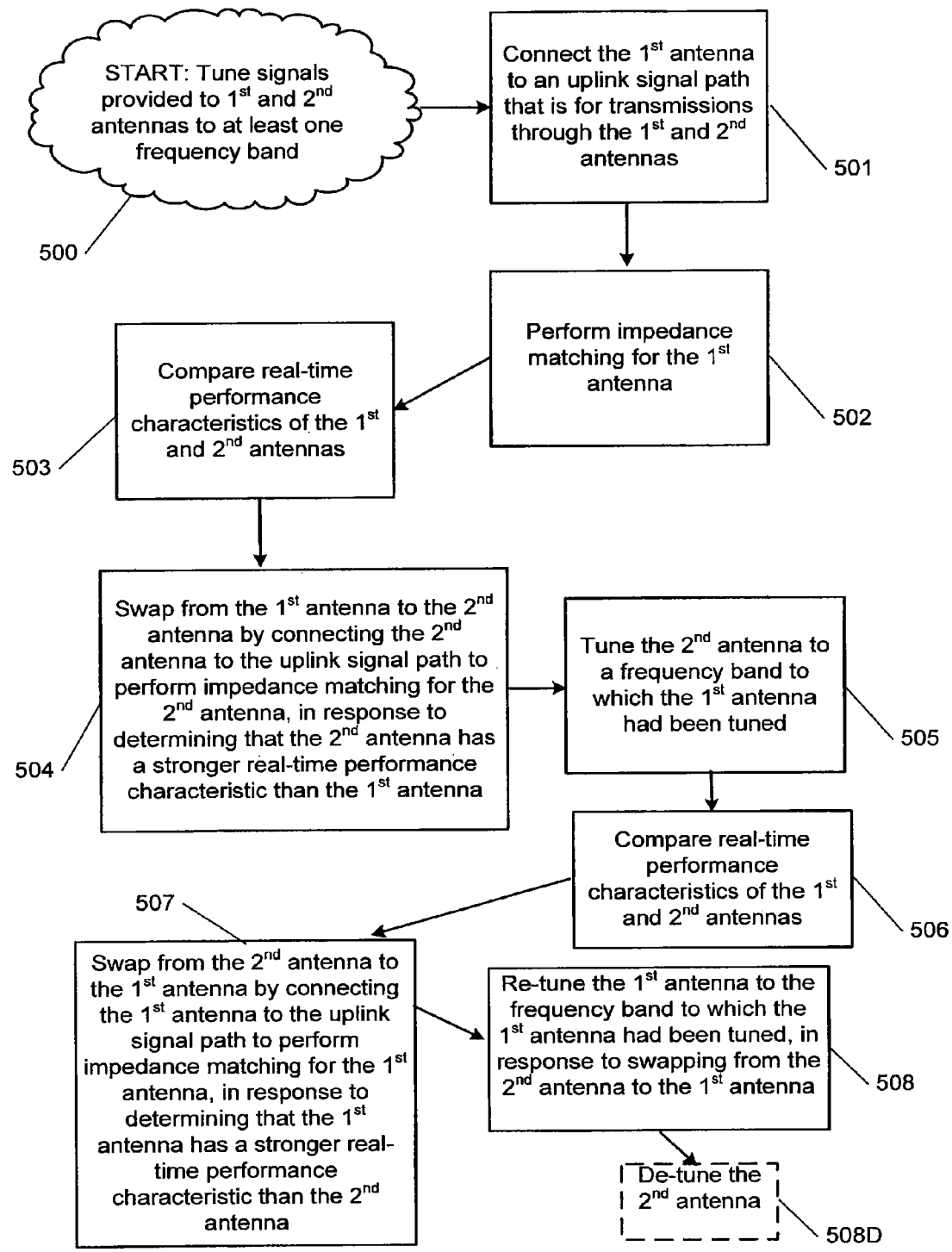

Referring to FIG. 5C, the operations include Blocks 500-505 of FIG. 5B and further include Blocks 506-508. In particular, Block 506 illustrates comparing the real-time performance characteristic of the first antenna 210 with the real-time performance characteristic of the second antenna 220 after Block 505's tuning of the second antenna 220. The operations further include swapping from the second antenna 220 to the first antenna 210 (by connecting the first antenna 210 to the uplink signal path 348' to perform impedance matching) upon determining that the real-time performance characteristic of the first antenna 210 exceeds the real-time performance characteristic of the second antenna 220 (Block 507). The operations additionally include re-tuning the first antenna 210 to the frequency band to which the first antenna 210 had been tuned (e.g., at or before Block 504) in response to (or as a part of) swapping from the second antenna 220 to the first antenna 210 (Block 508). The operations may optionally include de-tuning the second antenna 220 (Block 508D). Moreover, it will be understood that re-tuning the first antenna 210 may be embodied by re-tuning the first antenna 210 even if it has remained tuned to the same frequency band throughout the swapping in Blocks 504 and 507.

Figure 5D:
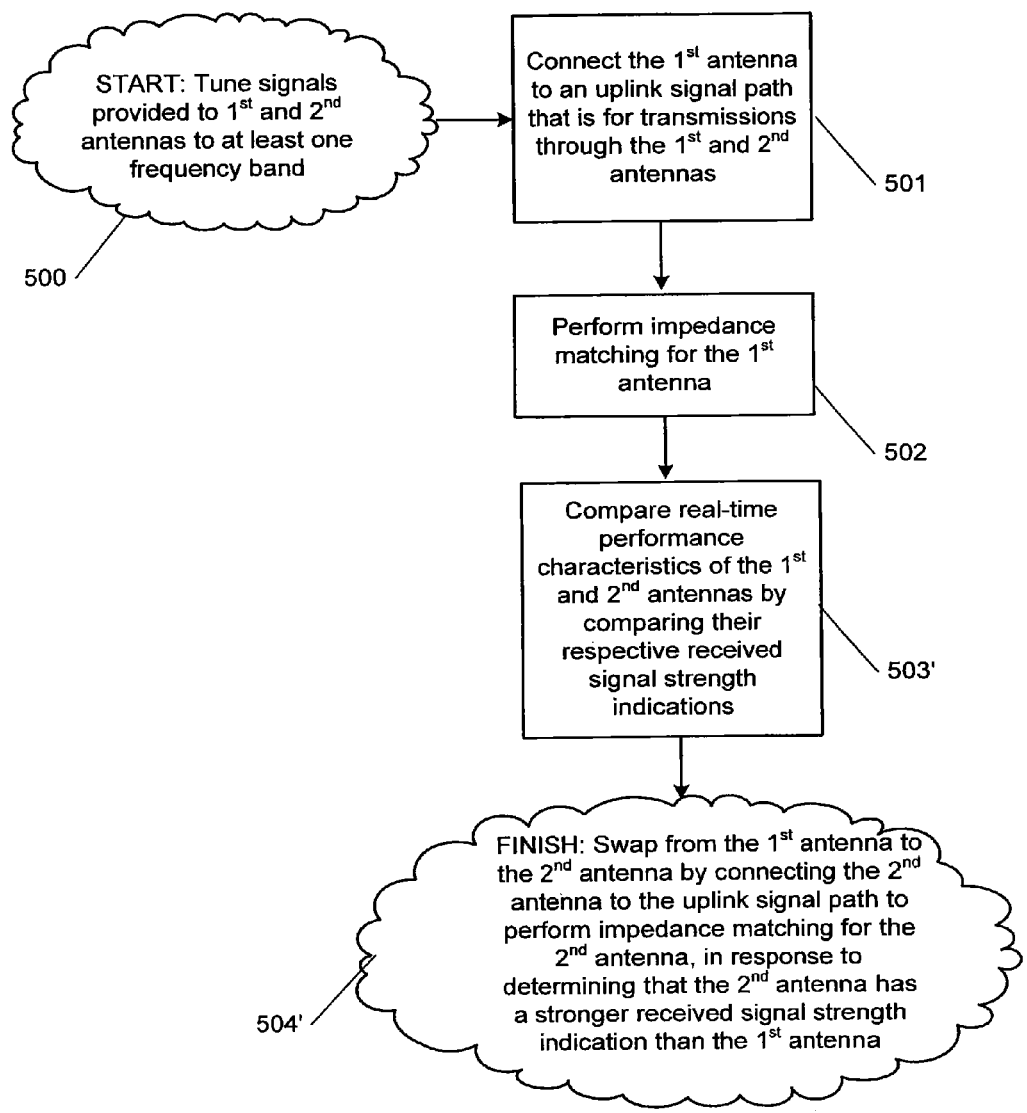

Referring to FIG. 5D, the operations include Blocks 500-502 of FIG. 5A and further include Blocks 503' and 504', which are modifications of FIG. 5A's Blocks 503 and 504, respectively. In particular, Block 503' of FIG. 5D clarifies that comparing the real-time performance characteristics of the first and second antennas 210, 220, respectively, may include comparing a Received Signal Strength Indication (RSSI) of the first antenna 210 with an RSSI of the second antenna 220. As an example, MIMO and diversity operational modes may provide for such real-time RSSI comparisons using the RSSI comparator circuit 367 illustrated in FIGS. 3B and 3C. Additionally, Block 504' of FIG. 5D clarifies that swapping from the first antenna 210 to the second antenna 220 may be performed in response to determining that the second antenna 220 has a stronger RSSI than the first antenna 210.

Figure 5E:
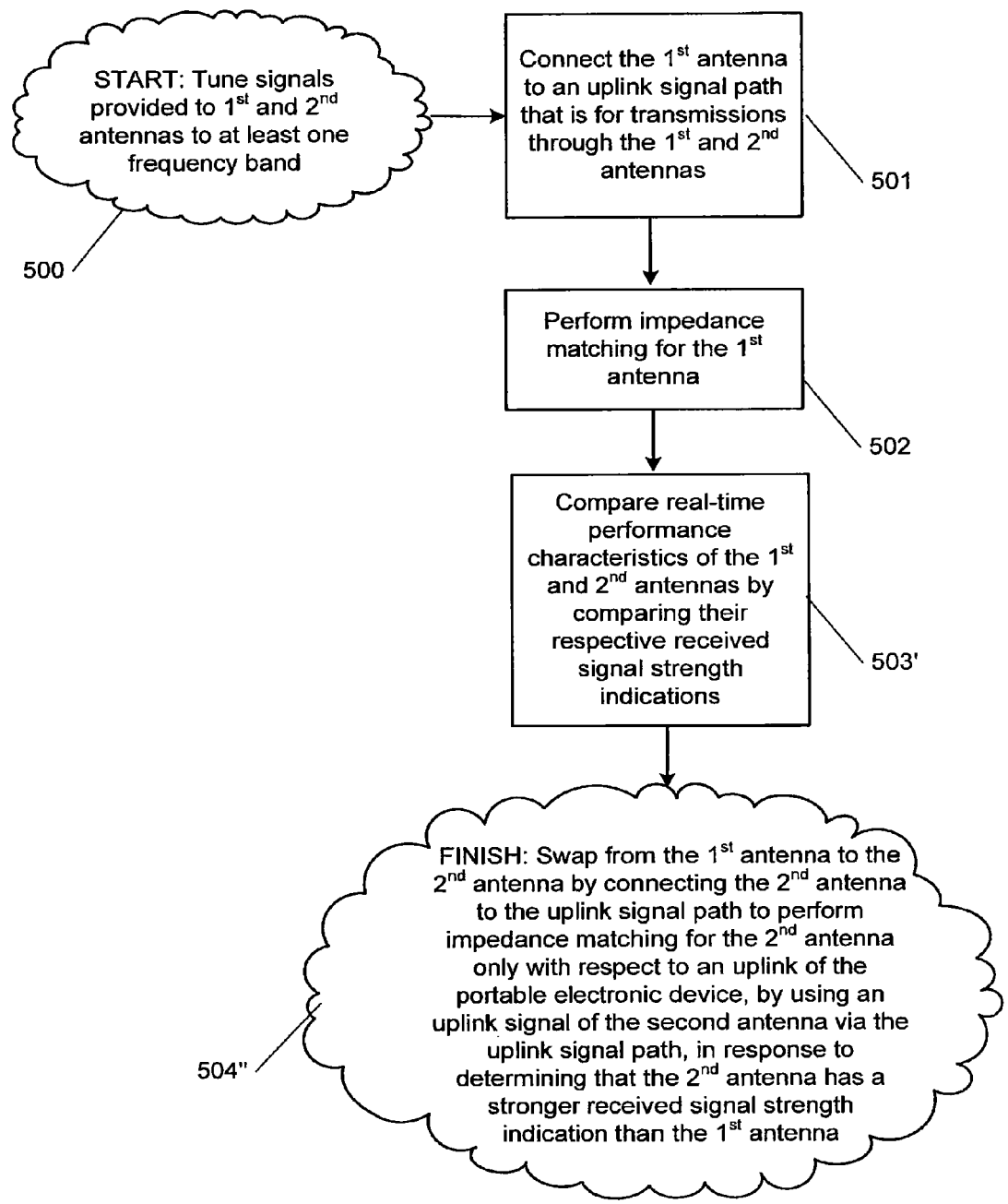

Referring to FIG. 5E, the operations include Blocks 500-503' of FIG. 5D and further include Block 504'', which is a modification of FIG. 5D's Block 504'. In particular, Block 504'' of FIG. 5E clarifies that impedance-matching the second antenna 220 may include performing impedance matching only/exclusively with respect to an uplink (rather than a downlink) of the portable electronic device 100, by using an uplink signal of the second antenna 220 via the uplink signal path 348'.

Figure 5F:
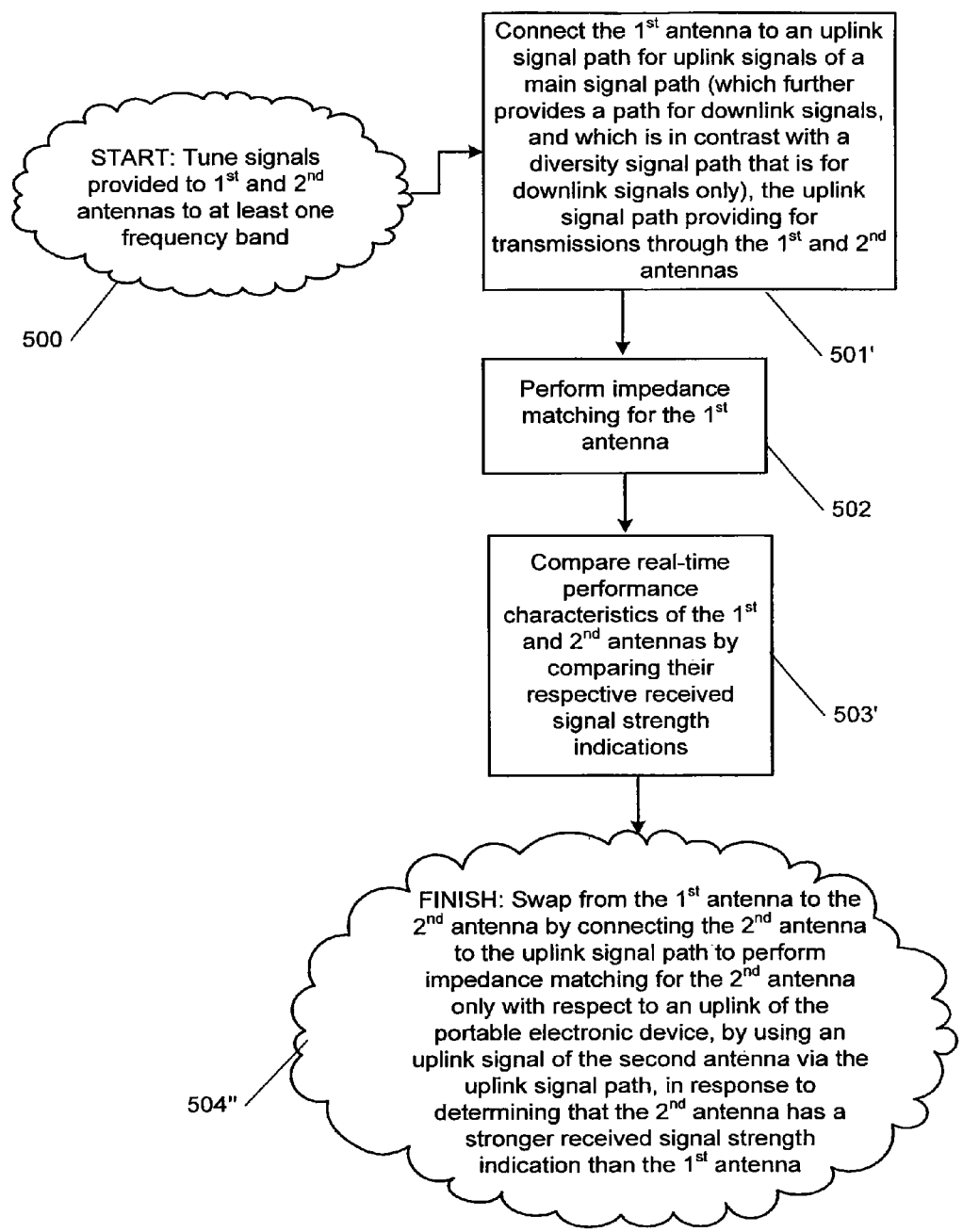

Referring to FIG. 5F, the operations include Blocks 500, and 502-504'' of FIG. 5E and further include Block 501', which is a modification of Figure SE's Block 501. In particular, Block 501' of FIG. 5F clarifies that the uplink signal path 348' for uplink signals may be included as a part of the main signal path 344 in the portable electronic device 100, and that the main signal path 344 may further provide a path (e.g., the downlink path 349') for downlink signals. Block 501' of FIG. 5F also clarifies that the portable electronic device 100 further includes the diversity signal path 347 that is for downlink signals only (e.g., as indicated by the downlink path 357').

Figure 5G:
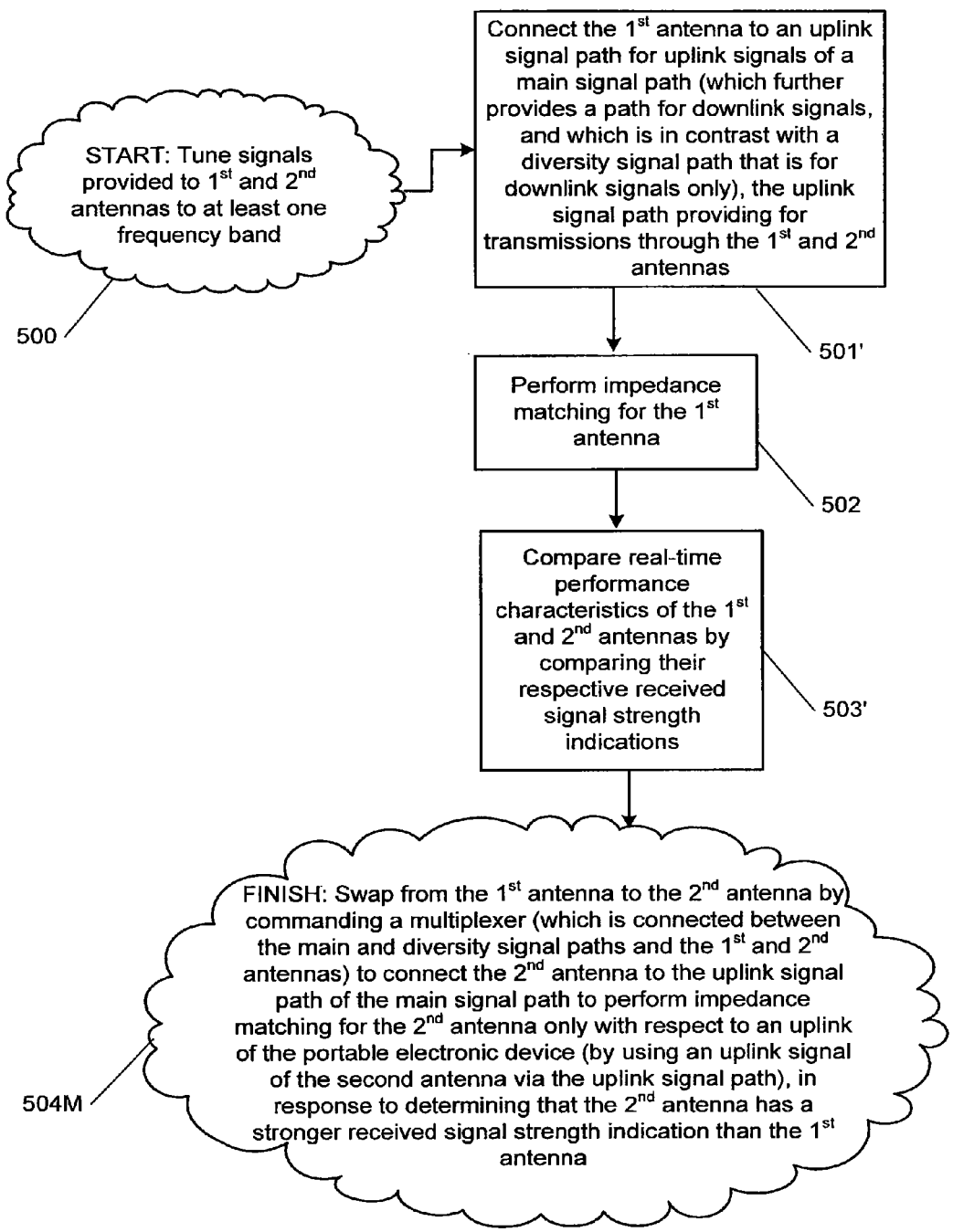

Referring to FIG. 5G, the operations include Blocks 500-503' of FIG. 5F and further include Block 504M, which is a modification of FIG. 5F's Block 504". In particular, Block 504M of FIG. 5G clarifies that the operations may further include connecting the second antenna 220 to the main signal path 344 in response to comparing the RSSI of the first antenna 210 with the RSSI of the second antenna 220 and determining that the second antenna 220 has a stronger signal strength. Additionally, Block 504M of FIG. 5G clarifies that swapping from the first antenna 210 to the second antenna 220 may include commanding the multiplexer 340 connected between the main and diversity signal paths 344, 347 and the first and second antennas 210, 220 to connect the second antenna 220 to the main signal path 344.

Figure 5H:
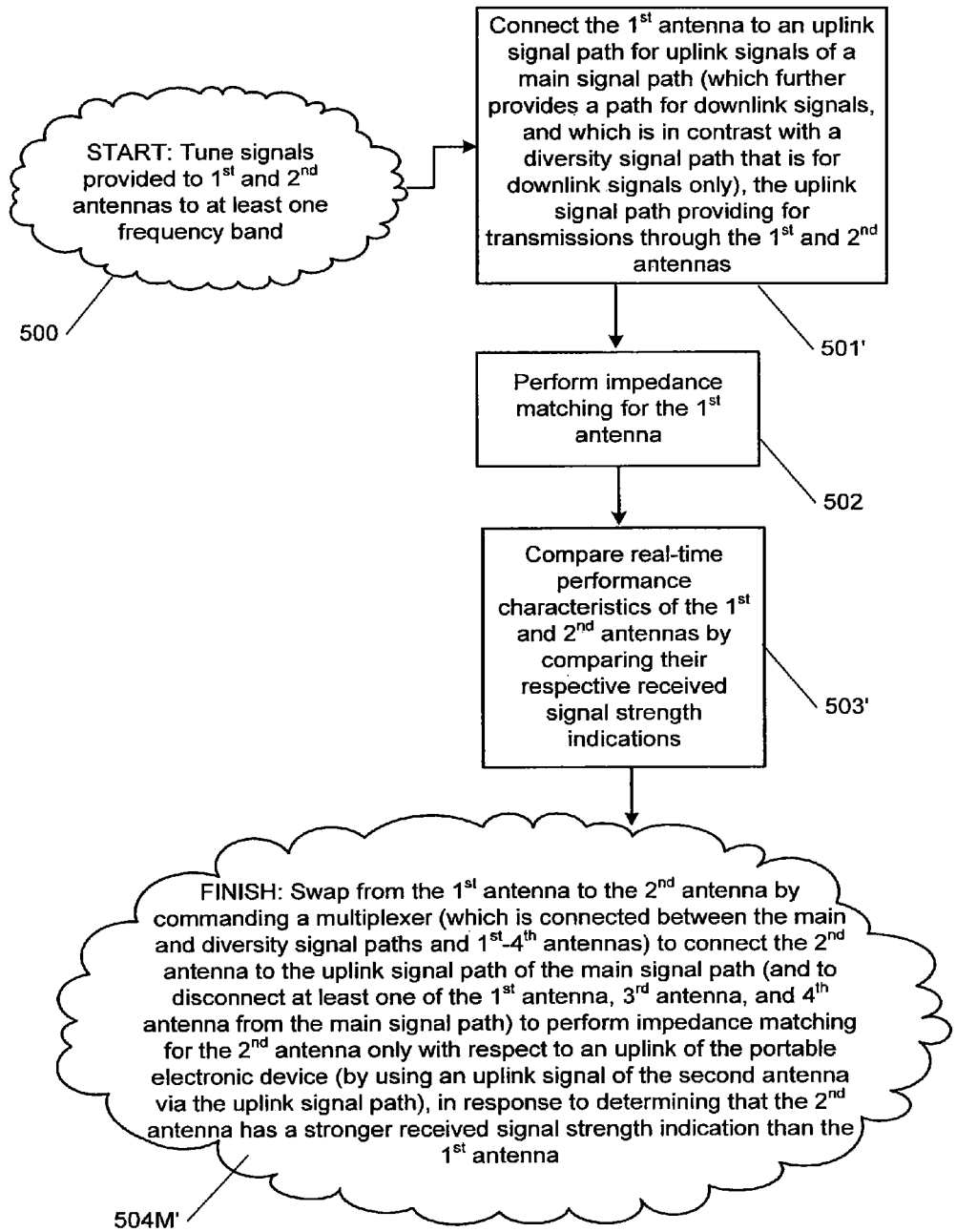

Referring to FIG. 5H, the operations include Blocks 500-503' of FIG. 5G and further include Block 504M', which is a modification of FIG. 5G's Block 504M. In particular, Block 504M' of FIG. 5H clarifies that the third and fourth antennas 410, 420 may also be connected to the multiplexer 340. Additionally, Block 504M' of FIG. 5H clarifies that commanding the multiplexer 340 to connect the second antenna 220 to the main signal path 344 may include commanding the multiplexer 340 to disconnect at least one of the first, third, and fourth antennas 210, 410, 420 from the main signal path 340.

Furthermore, referring again to FIG. 4, the portable electronic device 100 may include several antennas at several different possible locations. According to various embodiments, the multiplexer 340 may connect any combination/pair of the antennas to the main signal path 344. For example, the multiplexer 340 may connect the second antenna 220 and the side antenna 430 to the main signal path 344, and may disconnect the first antenna 210 and the third antenna 410 from the main signal path 344.

Moreover, it will be understood by those skilled in the art that a controller (e.g., the processor 351 and/or another controller) may be configured to control the components of the portable electronic device 100. For example, the controller may be configured to command the multiplexer 340 to connect the second and third antennas 220, 410 to the main signal path 344, and to disconnect the first and fourth antennas 210, 420 from the main signal path 344.

As another example, the controller of the portable electronic device 100 may use an antenna tuning algorithm and an antenna swapping algorithm to provide commands to the antenna tuning circuitry 339 and the multiplexer 340, respectively. The antenna tuning algorithm and/or the antenna swapping algorithm may be controlled/performed by at least one of the RF ASIC 342, the processor 351, and another processor/ASIC. Additionally, the antenna tuning algorithm and the antenna swapping algorithm may be stored in the memory 353, the RF ASIC 342, and/or another non-transitory storage medium within the portable electronic device 100. Also, the antenna tuning algorithm and the antenna swapping algorithm may be separate algorithms or may be combined into a single algorithm. Moreover, the output of the antenna tuning algorithm may provide an input to the antenna swapping algorithm, or vice versa. For example, the RF ASIC 342 may provide the RSSI values for the first and second antennas 210, 220 to the antenna swapping algorithm, which may then provide an output that commands the multiplexer 340 to connect a particular one of the first and second antennas 210, 220 to the uplink signal path 348' of the main signal path 344.

Accordingly, the antenna swapping algorithm may determine that one of the first and second antennas 210, 220 (or any combination/pair of the antennas illustrated in FIG. 4) has a better/stronger signal strength, and may thus command the multiplexer 340 to swap the antennas to use the uplink signal path 348' for the better/stronger antenna (or combination/pair of antennas). Moreover, the antenna swapping and/or tuning algorithm(s) may save the tuning/impedance-matching settings of the antenna that was connected to the uplink signal path 348' before the swapping, and may tune/impedance-match the antenna that is swapped to the uplink signal path 348' using these saved settings.

Additionally, the antenna tuning algorithm may be used to tune the antennas to meet the requirements of different networks accessed by the portable electronic device 100. As an example, the antenna tuning algorithm may control the antenna tuning circuitry 339 to change a central frequency of a given antenna (e.g., among the antennas illustrated in FIG. 4).

Furthermore, antennas in the portable electronic device 100 may need to be tuned after swapping whenever they/their operations are not identical. As an example, the first and second antennas 210, 220 of the portable electronic device 100 may both be configured to operate in voice and data frequency bands simultaneously. In particular, the first antenna 210 may be tuned to cover a main data frequency band, whereas the second antenna 220 may be tuned to cover voice and MIMO data frequency bands. Accordingly, if the first and second antennas 210, 220 are swapped, then their tuning may need to be reconfigured (i.e., the second antenna 220 may be tuned to cover the main data frequency band to which the first antenna 210 had been tuned before the swapping).

Many different embodiments have been disclosed herein, in connection with the above description and the drawings. It will be understood that it would be unduly repetitious and obfuscating to literally describe and illustrate every combination and subcombination of these embodiments. Accordingly, the present specification, including the drawings, shall be construed to constitute a complete written description of all combinations and subcombinations of the embodiments described herein, and of the manner and process of making and using them, and shall support claims to any such combination or subcombination.

In the drawings and specification, there have been disclosed various embodiments and, although specific terms are employed, they are used in a generic and descriptive sense only and not for purposes of limitation.

What is claimed is:

1. An antenna switching method of a portable electronic device comprising first and second antennas, the method comprising:
   connecting the first antenna to an uplink signal path;
   comparing a real-time performance characteristic of the first antenna with a real-time performance characteristic of the second antenna;
   determining that the second antenna has a stronger real-time performance characteristic than the first antenna while the first antenna is connected to the uplink signal path; and
   responsive to the determining that the second antenna has the stronger real-time performance characteristic, switching from the first antenna to the second antenna by connecting the second antenna to the uplink signal path and disconnecting the first antenna from the uplink signal path.

2. The method of claim 1, further comprising:
   tuning respective signals provided to the first and second antennas to at least one frequency band; and after determining that the second antenna has a stronger real-time performance characteristic than the first antenna, tuning the second antenna to a frequency band to which the first antenna had been tuned.

3. The method of claim 2, wherein tuning the respective signals provided to the first and second antennas to at least one frequency band comprises tuning the respective signals before switching from the first antenna to the second antenna.

4. The method of claim 2, further comprising:
after tuning the second antenna to a frequency band to which the first antenna had been tuned, comparing the real-time performance characteristic of the first antenna with the real-time performance characteristic of the second antenna;
upon determining that the real-time performance characteristic of the first antenna exceeds the real-time performance characteristic of the second antenna, switching from the second antenna to the first antenna; and
in response to switching from the second antenna to the first antenna, re-tuning the first antenna to the frequency band to which the first antenna had been tuned.

5. The method of claim 1, wherein comparing the real-time performance characteristics of the first and second antennas, respectively, comprises comparing a received signal strength indication of the first antenna with a received signal strength indication of the second antenna.

6. The method of claim 5, further comprising performing impedance matching only with respect to an uplink of the portable electronic device, by using an uplink signal of the second antenna via the uplink signal path.

7. The method of claim 6, wherein:
a main signal path in the portable electronic device comprises the uplink signal path for uplink signals and further provides a path for downlink signals; and
the portable electronic device further comprises a diversity signal path that is for downlink signals only.

8. The method of claim 7, further comprising:
connecting the second antenna to the main signal path in response to comparing the received signal strength indication of the first antenna with the received signal strength indication of the second antenna and determining that the second antenna has a stronger signal strength.

9. The method of claim 7, wherein:
switching from the first antenna to the second antenna comprises commanding a multiplexer connected between the main and diversity signal paths and the first and second antennas to connect the second antenna to the main signal path;
third and fourth antennas are also connected to the multiplexer; and
commanding the multiplexer to connect the second antenna to the main signal path comprises commanding the multiplexer to disconnect at least one of the first, third, and fourth antennas from the main signal path.

10. A portable electronic device, comprising:
first and second antennas connected to a multi-band transceiver circuit configured to provide communications for the portable electronic device via a plurality of frequency bands, the first and second antennas being connected to the multi-band transceiver circuit via main and diversity signal paths, respectively, the main signal path comprising an uplink signal path; and
a controller configured to:
compare a real-time performance characteristic of the first antenna with a real-time performance characteristic of the second antenna;
determine that the second antenna has a stronger real-time performance characteristic than the first antenna while the first antenna is connected to the uplink signal path; and
switch from performing impedance matching for the first antenna to performing impedance matching for the second antenna by connecting the second antenna to the uplink signal path and disconnecting the first antenna from the uplink signal path, responsive to the determination.

11. The portable electronic device of claim 10, wherein:
the main signal path provides a path for both uplink and downlink signals, whereas the diversity signal path provides a path for downlink signals only.

12. The portable electronic device of claim 10, further comprising antenna tuning circuitry configured to tune respective signals provided to the first and second antennas to at least one of the plurality of frequency bands, wherein the antenna tuning circuitry is configured to tune the second antenna to a frequency band to which the first antenna had been tuned, after determining that the second antenna has a stronger real-time performance characteristic than the first antenna.

13. The portable electronic device of claim 12, wherein the antenna tuning circuitry is configured to tune the first and second antennas to at least one of the plurality of frequency bands before the controller switches from performing impedance matching for the first antenna to performing impedance matching for the second antenna.

14. The portable electronic device of claim 10, wherein the controller is configured to command a multiplexer connected between the main and diversity signal paths and the first and second antennas to switch which of the first and second antennas is connected to the main signal path.

15. The portable electronic device of claim 14, wherein:
the portable electronic device comprises a non-transitory storage medium that stores at least one of an antenna tuning algorithm and an antenna switching algorithm;
the controller is configured to control input of the real-time performance characteristics of the first and second antennas, respectively, into the at least one of the antenna tuning algorithm and the antenna switching algorithm; and
the controller is further configured to control input of an output of the at least one of the antenna tuning algorithm and the antenna switching algorithm into the multiplexer to switch which of the first and second antennas is connected to the main signal path.

16. The portable electronic device of claim 14, further comprising:
first and second couplers configured to sense uplink signal power, the first and second couplers being connected between the first and second antennas, respectively, and the multiplexer.

17. The portable electronic device of claim 14, further comprising:
a coupler configured to sense uplink signal power, the coupler being connected between the multiplexer and the multi-band transceiver circuit.

18. The portable electronic device of claim 14, further comprising:
third and fourth antennas connected to the multiplexer, wherein the controller is configured to command the multiplexer to connect at least one of the first, second, third, and fourth antennas to the main signal path, wherein the controller is configured to command the multiplexer to connect the second and third antennas to the main signal path, and to disconnect the first and fourth antennas from the main signal path.

19. The portable electronic device of claim 10, further comprising:

a multiplexer that is connected to both the uplink signal path and the diversity signal path, wherein the diversity signal path comprises a downlink-only diversity signal path, and wherein the controller is configured to perform the switch via the multiplexer that is connected to both the uplink signal path and the downlink-only diversity signal path.

20. An antenna switching method of a portable electronic device comprising first and second antennas, the method comprising:

connecting the first antenna to an uplink signal path;

comparing a real-time performance characteristic of the first antenna with a real-time performance characteristic of the second antenna;

determining that the second antenna has a stronger real-time performance characteristic than the first antenna while the first antenna is connected to the uplink signal path; and responsive to the determining that the second antenna has the stronger real-time performance characteristic, switching from performing impedance matching for the first antenna to performing impedance matching for the second antenna by connecting the second antenna to the uplink signal path and disconnecting the first antenna from the uplink signal path, wherein the switching comprises switching using a multiplexer that is connected to both the uplink signal path and a downlink-only diversity signal path.

* * * * *